United States Patent
Kedir et al.

(10) Patent No.: US 10,160,675 B1
(45) Date of Patent: *Dec. 25, 2018

(54) PROCESS FOR FILTERING AND TREATING AN MTBE-CONTAMINATED AQUEOUS LIQUID

(71) Applicant: KING FAHD UNIVERSITY OF PETROLEUM AND MINERALS, Dhahran (SA)

(72) Inventors: Amana Jemal Kedir, Dhahran (SA); Bassam Tawabini, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/149,648

(22) Filed: Oct. 2, 2018

Related U.S. Application Data

(63) Continuation of application No. 15/048,390, filed on Feb. 19, 2016, now Pat. No. 10,125,038.

(51) Int. Cl.
  *C02F 1/32* (2006.01)
  *C02F 1/66* (2006.01)
  (Continued)

(52) U.S. Cl.
  CPC ............... *C02F 1/66* (2013.01); *C02F 1/32* (2013.01); *C02F 1/76* (2013.01); *C02F 1/722* (2013.01);
  (Continued)

(58) Field of Classification Search
  CPC ...... C02F 1/32; C02F 1/76; C02F 1/66; C02F 2201/322; C02F 2103/06; C02F 1/30; C02F 2101/34; C02F 2305/023
  See application file for complete search history.

(56) References Cited

U.S. PATENT DOCUMENTS 8,398,828 B1   3/2013 Winkie et al.
2002/0030021 A1  3/2002 Pappa
(Continued)

FOREIGN PATENT DOCUMENTS

EP   2 610 221 A1   7/2013
EP   2610221 A1 *  7/2013  .............. C02F 1/325

OTHER PUBLICATIONS

Bassam S. Tawabini, "Simultaneous Removal of MTBE and Benzene from Contaminated Groundwater Using Ultraviolet-Based Ozone and Hydrogen Peroxide", International Journal of Photoenergy, vol. 2014, Article ID 452356, 2014, 7 pages.
(Continued)

*Primary Examiner* — Walter D. Griffin
*Assistant Examiner* — Cameron J Allen
(74) *Attorney, Agent, or Firm* — Oblon, McClelland, Maier & Neustadt, L.L.P.

(57) ABSTRACT

A process for decontaminating a contaminated aqueous liquid comprising methyl-tert-butyl ether (MTBE) involving pretreating the contaminated aqueous liquid with chlorine and/or a hypochlorous acid salt and irradiating the aqueous liquid with an ultraviolet wavelength to produce a radical molecular species that degrades the MTBE. MTBE is degraded into at least one degradation byproduct including tert-butyl formate (TBF), tert-butyl alcohol (TBA), acetone, carbon dioxide, and water.

12 Claims, 19 Drawing Sheets

(51) Int. Cl.
*C02F 1/76* (2006.01)
*C02F 1/72* (2006.01)
*C02F 1/78* (2006.01)
*C02F 103/06* (2006.01)
*C02F 101/34* (2006.01)

(52) U.S. Cl.
CPC .............. *C02F 1/78* (2013.01); *C02F 2101/34* (2013.01); *C02F 2103/06* (2013.01); *C02F 2305/023* (2013.01); *Y02W 10/37* (2015.05)

(56) References Cited

U.S. PATENT DOCUMENTS

| | | |
|---|---|---|
| 2002/0033369 A1 | 3/2002 | Bender |
| 2011/0180423 A1 | 7/2011 | Barry et al. |
| 2014/0224648 A1 | 8/2014 | Andrews |
| 2014/0263086 A1 | 9/2014 | Kozlowski |
| 2016/0368787 A1 | 12/2016 | Barreto |

OTHER PUBLICATIONS

B. Tawabini, et al., "The impact of groundwater quality on the removal of methyl tertiary-butyl ether (MTBE) using advanced oxidation technology", Water Science and Technology, vol. 60, No. 8, 2009, pp. 2161-2165 (Abstract only).

Ke Li, et al., "Evaluating UV/$H_2O_2$ processes for methyl tert-butyl ether and tertiary butyl alcohol removal: Effect of pretreatment options and light sources", Water Research, vol. 42, Issue 20, Dec. 2008, pp. 5045-5053 (Abstract only).

Jing Jin, et al., "Assessment of the UV/Chlorine process as an advanced oxidation process", Water Research, vol. 45, No. 4, 2011, pp. 1890-1896.

Ding Wang, et al., "Medium pressure UV combined with chlorine advanced oxidation for trichloroethylene destruction in a model water", Water Research, vol. 46, No. 15, 2012, pp. 4677-4686.

C. Sichel, et al., "Feasibility studies: UV/chlorine advanced oxidation treatment for the removal of emerging contaminants", Water Research, vol. 45, No. 19, Nov. 2011, pp. 6371-6380 (Abstract only).

Michael J. Watts, et al., "Chlorine photolysis and subsequent OH radical production during UV treatment of chlorinated water", Water Research, vol. 41, Issue 13, Jul. 2007, pp. 2871-2878 (Abstract only).

\* cited by examiner

PROCESS FOR FILTERING AND TREATING AN MTBE-CONTAMINATED AQUEOUS LIQUID

CROSS-REFERENCE TO RELATED APPLICATIONS

The present application is a Continuation of Ser. No. 15/048,390, now allowed, having a filing date of Feb. 19, 2016.

BACKGROUND OF THE INVENTION

Technical Field

The present invention relates to a water treatment process that includes oxidizing organic contaminants under exposure to ultraviolet light, especially as it relates to the removal of traces of methyl tertiary-butyl ether (MTBE).

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The chemical water pollutant, methyl tertiary butyl ether (MTBE), is a well-known groundwater contaminant which mainly originates from petrochemical and transportation industries. Higher production levels and widespread use of MTBE make it likely to be present in groundwater sources. Leakage from underground storage tanks and pipelines, spills, contaminated sites, releases from manufacturing, storage sites, and at gasoline filling stations account for the major sources of environmental contamination.

Contamination of drinking water with MTBE has raised considerable concern among health officials and water suppliers. The US Environmental Protection Agency considers MTBE to be a potential human carcinogen, and set an advisory level of 20-40 μg/L. See U.S. Environmental Protection Agency, (1997b). Drinking Water Advisory: Consumer Acceptability Advice and Health Effects Analysis on Methyl Tertiary-Butyl Ether (MTBE). Washington, D.C.: U.S. Environmental Protection Agency, Office of Water, EPA-822-F-97-009. However, remediation of MTBE from water is challenging and expensive due to MTBE's high solubility in water (50,000 mg/l), low biodegradability, low Henry's constant, very low affinity for common adsorbents, high mobility, and public health concern. See McCarthy & Tiemann, "MTBE in gasoline: clean air and drinking water issues" Congressional Research Service Reports, 2006; J. Reuter, Allen, & Goldman, "Methyl tert-butyl ether in surface drinking water supplies," Health and environmental assessment of MTBE, UC Toxics Research and Teaching Program, UC Davis 3 (1998); J. E. Reuter et al., 1998, "Concentrations, Sources, and Fate of the Gasoline Oxygenate Methyl tert-Butyl Ether (MTBE) in a Multiple-Use Lake," Environmental Science & Technology, 32(23), 3666-3672, each incorporated herein by reference in their entirety. Advanced oxidation processes (AOPs) have been acknowledged as promising treatment technologies for water contaminated with MTBE. AOPs have shown great potential in removing organic contaminants at low and high levels in groundwater, municipal and industrial wastewater. See Kavanaugh, Michael, and Z. Chowdhury, "Removal of MTBE with advanced oxidation processes," Iwa Publishing, 2004, incorporated herein by reference in its entirety. Ultraviolet (UV)-driven AOPs are primarily based on the generation of powerful oxidizing species, such as the hydroxyl radical (OH.). These processes make use of hydroxyl radicals (OH.) to oxidize all organic pollutants present in water into carbon dioxide and water.

The chlorine based photochemical oxidation or UV/Cl2 is one type of AOP used to degrade organic contaminants. The photo-chemistry of the UV/chlorine process predominantly generates hydroxyl (OH) radical in addition to chlorine radical. The pseudo-first-order rate constant for the photolysis of HOCl and OCl⁻ at 330 nm (sunlight exposure) was reported as $2\times10^{-4} s^{-1}$ and $1.2\times10^{-3} s^{-1}$, respectively. Sodium hypochlorite (NaOCl) has been also used to oxidize secondary (2°) alcohols to ketones.

At favorable pH, free chlorine is available in water as an aqueous solution. The photochemistry of UV/Cl₂ AOP is described by the reactions below. See Jin, Jing, Mohamed Gamal El-Din, and James R. Bolton. "Assessment of the UV/Chlorine process as an advanced oxidation process." water research 45.4 (2011): 1890-1896; Wang, Ding, James R. Bolton, and Ron Hofmann. "Medium pressure UV combined with chlorine advanced oxidation for trichloroethylene destruction in a model water." water research 46.15 (2012): 4677-4686, each incorporated herein by reference in their entirety.

$$Cl_2 + H_2O \rightarrow OCl + HCl \quad (1)$$

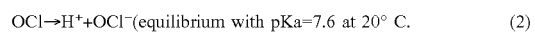

$$OCl \rightarrow H^+ + OCl^- \text{(equilibrium with pKa=7.6 at 20° C.} \quad (2)$$

$$OCl + UV\ photons \rightarrow .OH + Cl. \quad (3)$$

$$OCl^- + UV\ photons \rightarrow .O^- + Cl. \quad (4)$$

$$.O^- + H_2O \rightarrow .OH + OH^- \quad (5)$$

The availability of free chlorine is dependent on the pH of the solution, as discussed by several studies. In conventional processes the percent availability of free chlorine species at room temperature may be 99.7% HOCl, 52.3% HOCl+ 47.7% OCl⁻, and 99.6% OCl⁻ at pH 5, 7.5 and 10, respectively. See Chan, Po Yee, Mohamed Gamal El-Din, and James R. Bolton. "A solar-driven UV/Chlorine advanced oxidation process." water research 46.17 (2012): 5672-5682; Feng, Yangang, Daniel W. Smith, and James R. Bolton. "Photolysis of aqueous free chlorine species (HOCl and OCl) with 254 nm ultraviolet light." Journal of Environmental Engineering and Science 6.3 (2007): 277-284; Mofidi, A. A., Min, J. H., Palencia, L. S., & Coffey, B. M. (2002). Task 2.1: Advanced Oxidation Processes and UV Photolysis for Treatment of Drinking Water Submitted by: Sun Liang, James F. Green Metropolitan Water District of Southern California La Verne, Calif. Submitted to: California Energy Commission, (January); Nowell, Lisa H., and Jürg Hoigné. "Photolysis of aqueous chlorine at sunlight and ultraviolet wavelengths—I. Degradation rates." Water Research 26.5 (1992): 593-598; Watts, Michael J., and Karl G. Linden. "Chlorine photolysis and subsequent OH radical production during UV treatment of chlorinated water." Water Research 41.13 (2007): 2871-2878; Weng, ShihChi, Jing Li, and Ernest R. Blatchley. "Effects of UV 254 irradiation on residual chlorine and DBPs in chlorination of model organic-N precursors in swimming pools." water research 46.8 (2012): 2674-2682; Rick Bond, P. E., B. & V. Advanced Oxidation Processes: White's Handbook of Chlorination and Alternative Disinfectants, Fifth Edition, (2010)

976-1002; White, G. C., & International, B. and V. (2010). Chlorination and Alternative Disinfectants (5th Edition). Wiley, each incorporated herein by reference in their entirety.

Only a few studies investigated the use of aqueous chlorine as the chemical oxidant for UV-driven AOP as an alternative to other chemical oxidants like hydrogen peroxide, and ozone. Similar to UV/$H_2O_2$, AOPs, UV-induced chlorine AOPs (UV/$Cl_2$ AOP) produce hydroxyl and other radicals when water dosed with aqueous chlorine in the form of hypochlorous acid (HOCl) or hypochlorite ions (ClO$^-$) and exposed to UV light. Hypochlorous acid (HOCl) has higher UV absorbance and a lower scavenging rate than $H_2O_2$. In contrast, ClO— scavenges OH radicals about four orders of magnitude faster than HOCl or $H_2O_2$, indicating that UV/$Cl_2$ AOPs are generally more efficient at lower water pH. UV/$Cl_2$ was efficiently able to degrade trichloroethylene, Methylisoborneol in water than UV/$H_2O_2$ process. See Rosenfeldt, Erik, et al. "Tech Talk—Comparison of UV-mediated Advanced Oxidation (PDF)." Journal-American Water Works Association 105.7 (2013): 29-33; Wang, Ding, James R. Bolton, and Ron Hofmann. "Medium pressure UV combined with chlorine advanced oxidation for trichloroethylene destruction in a model water." Water Research 46.15 (2012): 4677-4686, each incorporated herein by reference in their entirety. A solar-driven UV/chlorine AOP was able to degrade methylene blue (MB) and cyclohexanoic acid (CHA) in water. Another study reported that UV/Chlorine AOP was also able to degrade emerging water contaminants with considerable energy reduction. A few studies investigated the use of UV/chlorine AOP for the degradation of organic contaminants in water and wastewater. The quantum yield of OH radical production from HOCl at a wavelength of 254 nm was found to be 1.4 mol·s$^{-1}$ greater than that of hydrogen peroxide (1.0 mol·s$^{-1}$) whereas other studies found the quantum yields of HOCl and OCl$^-$ are 1.0±0.1 and 0.9±0.1, respectively. Still, others have reported molar absorption coefficient of 155 and 121 ε254/M-1 cm-1 for HOCl and OCl$^-$, respectively. See Sichel, C., C. Garcia, and K. Andre. "Feasibility studies: UV/chlorine advanced oxidation treatment for the removal of emerging contaminants." Water Research 45.19 (2011): 6371-6380; Watts, Michael J., and Karl G. Linden, "Chlorine photolysis and subsequent OH radical production during UV treatment of chlorinated water." Water Research 41.13 (2007): 2871-28781; Nowell, Lisa H., and Jürg Hoigné. "Photolysis of aqueous chlorine at sunlight and ultraviolet wavelengths—II. Hydroxyl radical production." Water Research 26.5 (1992): 599-605. each incorporated herein by reference in their entirety.

In view of the forgoing, one objective of the present disclosure is to provide a process for the removal of MTBE and associated organic compounds from aqueous solution using a UV/chlorine process, optionally, under a continuous flow regime for MTBE and associated organic compound removal from aqueous solutions by UV/chlorine process.

BRIEF SUMMARY OF THE INVENTION

According to a first aspect, a process for decontaminating a contaminated aqueous liquid comprising methyl-tert-butyl ether (MTBE), including mixing chlorine ($Cl_2$) and/or a hypochlorous acid salt with the contaminated aqueous liquid to form a chlorinated aqueous liquid, comprising 10-50 ppm of chlorine and/or the hypochlorous acid salt, relative to the total mass of the chlorinated aqueous liquid, and irradiating the chlorinated aqueous liquid with light having a wavelength of about 254 from a monochromatic light source that generates a 254 nm wavelength of light or with a polychromatic light source having wavelengths between 200 nm and 370 nm to produce a radical molecular species that degrades the MTBE into at least one degradation byproduct selected from the group consisting of tert-butyl formate (TBF), tert-butyl alcohol (TBA), acetone, carbon dioxide and water and forms a decontaminated aqueous liquid, in which a concentration of MTBE in the contaminated aqueous liquid is higher than a concentration of MTBE in the decontaminated aqueous liquid.

In some implementations, the process includes mixing the chlorinated aqueous liquid after irradiating with an oxygen radical generating compound.

In some implementations, the oxygen radical generating compound is $O_3$ and/or $H_2O_2$.

In some implementations, the $O_3$ and/or $H_2O_2$ is added at 10-25 times the concentration of the chlorine and/or the hypochlorous acid salt in the chlorinated aqueous liquid.

In some implementations, the concentration of the chlorine and/or sodium hypochlorite is 10-50 times the concentration of the MTBE in the chlorinated aqueous liquid.

In some implementations, the process includes adjusting the pH of the contaminated aqueous liquid to a pH of 5-7 before mixing.

In some implementations, the process includes adjusting the pH with hydrochloric acid, sulfuric acid, or sodium hydroxide.

In some implementations, the light source power is between 10-200 W.

In some implementations, the light source has an intensity between $5 \times 10^{-3}$ W/cm$^2$-$7 \times 10^{-2}$ W/cm$^2$.

In some implementations, the irradiating takes place for 20-45 minutes.

In some implementations, the radical molecular species is at least one of a chlorine radical and a hydroxyl radical.

In some implementations, the concentration of MTBE is at least 1 ppm in the contaminated aqueous liquid and the concentration of MTBE is reduced by more than 92% in the decontaminated aqueous liquid.

According to another aspect, a continuous flow process for decontaminating a contaminated aqueous liquid comprising methyl-tert-butyl ether (MTBE), including flowing a contaminated aqueous liquid comprising water and the MTBE and pretreating the contaminated aqueous liquid with chlorine and/or a hypochlorous acid salt to forming a to form a chlorinated aqueous liquid comprising 10-50 ppm of chlorine and/or the hypochlorous acid salt, relative to the total mass of the chlorinated aqueous liquid and irradiating the chlorinated aqueous liquid with light having a wavelength of about 254 nm from a monochromatic light source that generates a 254 nm wavelength of light or with a polychromatic light source having wavelengths between 200 nm and 370 nm to produce a radical molecular species that degrades the MTBE into at least one degradation byproduct selected from the group consisting of tert-butyl formate (TBF), tert-butyl alcohol (TBA), acetone, carbon dioxide and water and forms a decontaminated aqueous liquid, in which a concentration of MTBE in the contaminated aqueous liquid is higher than a concentration of MTBE in the decontaminated aqueous liquid.

In some implementations, the continuous flow process includes mixing the chlorinated aqueous liquid after irradiating with an oxygen radical generating compound.

In some implementations, the oxygen radical generating compound is $O_3$ and/or $H_2O_2$.

In some implementations, the $O_3$ and/or $H_2O_2$ is added at 10-25 times the concentration of the chlorine and/or the hypochlorous acid salt.

In some implementations, the pretreating further comprises at least one process selected from pre-filtering, acidifying, basifying, and buffering.

In some implementations, the chlorine and/or sodium hypochlorite are added at a concentration of 10-50 times the concentration of the MTBE in the contaminated aqueous liquid.

In some implementations, the light source is a Low Pressure UV lamp or a Medium Pressure UV lamp.

In some implementations, the concentration of MTBE is at least 1 ppm in the contaminated aqueous liquid and the concentration of MTBE is reduced by more than 92% in the decontaminated aqueous liquid.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
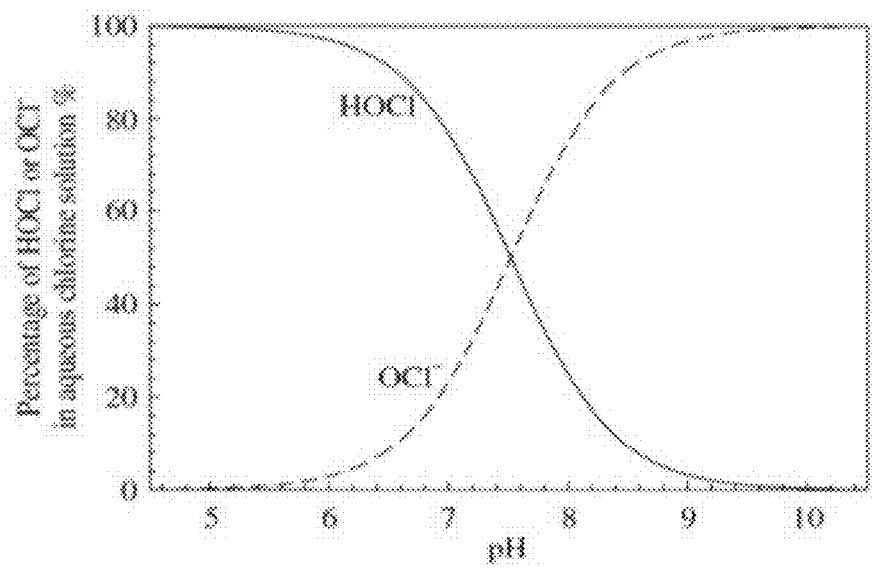
FIG. 1 is an exemplary graph of a dependence of the ratio of $HOCl/OCl^-$ on pH (pKa=7.5, at 25° C.).

Referring now to the drawings, wherein like reference numerals designate identical or corresponding parts throughout the several views.

The terms "approximately," "approximate," "about," and similar terms generally refer to ranges that include the identified value within a margin of 20%, 10%, or 5%, and any values therebetween.

Aspects of the current disclosure are directed to a process for decontaminating a contaminated aqueous liquid containing one or more organic contaminants such as an oxygenated hydrocarbon, e.g., methyl-tert-butyl ether (MTBE). The contaminated aqueous liquid may include, but is not limited to groundwater, industrial process liquids, and wastewater, or mixtures thereof. The contaminated aqueous liquid is mixed with a chlorine source such as a source of chlorine atoms, including chlorine, a hypochlorite (an ion composed of chlorine and oxygen, with the chemical formula $ClO^-$) and/or a hypochlorous acid salt, preferably sodium hypochlorite and/or calcium hypochlorite. The resultant mixture forms a chlorinated aqueous liquid. The concentration of chlorine and/or the hypochlorous acid salt, relative to the total mass of the chlorinated aqueous liquid can be 1-100 ppm, 5-80 ppm, 10-70 ppm, 15-60 ppm, 20-50 ppm, or 25-40 ppm. In some implementations, the concentration of the chlorine and/or the hypochlorous acid salt may be greater than the concentration of the MTBE in the chlorinated aqueous liquid by 2-100 times greater, 5-75 times greater, 10-50 times greater, or 15-25 times greater.

In some implementations, the process includes adjusting the pH of the contaminated aqueous liquid to a pH of 5-7 before mixing. Adjusting the pH may increase an effectiveness of the process for decontamination of the present disclosure by resulting in greater oxidation of organic contaminants. By adjusting the pH an effectiveness of the process for decontaminating can improve by at least 25%, by at least 35%, by at least 45%, by at least 50%. The effectiveness of decontaminating can be measured by the increased presence of degradation product in the chlorinated aqueous liquid over time. The pH may be adjusted by acidifying or basifying the contaminated aqueous liquid. The acidifying may be accomplished by adding an Arrhenius acid including, but not limited to an inorganic acid such as hydrochloric acid and/or sulfuric acid, or an organic acid such as acetic acid, propionic acid, or butyric acid. Inorganic acids are preferred to organic acids because organic acids will increase the amount of organic materials present in the chlorinated aqueous liquid, which may reduce the effectiveness of the process of decontamination. The basifying may be accomplished by adding an Arrhenius base including, but not limited to sodium hydroxide or potassium hydroxide. Basifying may also be accomplished by adding amines including, but not limited to methylamine, ethylamine, or pyridine, however FIG. 1 depicts the dependence of the ratio of $HOCl/OCl^-$ on pH. The concentration of free chlorine is highly dependent on pH. Free chlorine is the concentration of the chlorine present as hypochlorite ion and hypochlorous acid. The higher concentration of HOCl results in more free chlorine to oxidize an organic contaminant in the aqueous solution. The present disclosure employs the photooxidation of chlorine and photolysis of hypochlorous acid by utilizing ultraviolet light to induce an excitation of an electron in an atom of chlorine or molecule of a hydroxide ion resulting in a chlorine radical and hydroxyl radical.

The chlorinated aqueous liquid is preferably irradiated with UV light. The irradiating may be accomplished with a light source emitting an ultraviolet (UV) wavelength of about 254 nm from a monochromatic light source. In some implementations the light source may emit approximately 220 nm to 300 nm, preferably 235 nm to 280 nm, more preferably 245 nm to 265 nm, most preferably 250 nm to 260 nm of light among other wavelengths, as the case may be with a polychromatic light source. An example of a monochromatic light source may be a Xenon, Mercury, or LED light source filtered by a diffraction grating or prism monochromer to form a single wavelength or a narrow range of at most 15 nm, at most 10 nm, at most 5 nm, or at most 2 nm centralized around 254 nm. Another example may be a low pressure mercury lamp. In some implementations the polychromatic light source may be Xenon, Mercury, or LED. An example of a polychromatic light source may be a medium pressure mercury lamp having wavelengths between 200 nm and 370 nm. The light source may also be categorized by UV-A wavelengths (320 nm to 290 nm), UV-B wavelengths (290 nm to 320 nm), or UV-C wavelengths (100 nm to 400 nm). The light source power, intensity and exposure time of UV light determines the efficiency of the decontaminating of the contaminated aqueous liquid. In some implementations, the light source power is between 5-300 W, between 15-275 W, between 25-250 W, between 75-200 W, and between 100-175 W. In some implementations, the light source has intensity between $1 \times 10^{-3}$ $W/cm^2$-$15 \times 10^{-2}$ $W/cm^2$, between $5 \times 10^{-3}$ $W/cm^2$-$10 \times 10^{-2}$ $W/cm^2$, and between $6 \times 10^{-3}$ $W/cm^2$-$8 \times 10^{-2}$ $W/cm^2$. In some implementations, the irradiating takes place for an exposure time of at least 1-60 minutes, at least 5-50 minute, at least 10-40 minutes, and at least 15-30 minutes. In some implementations, the light source power, emitted wavelength range, intensity, and exposure time can be adjustable. In some implementations the light source may be pulsed at a plurality of frequencies including, but not limited to at least 50 $s^{-1}$, at least 100 $s^{-1}$, at least 150 $s^1$, at least 200 $s^1$, at least 250 $s^1$, at least 300 $s^1$, at least 350 $s^1$, at least 500 $s^{-1}$, at least 750 $s^1$, at least 1000 $s^1$, at least 1500 $s^1$. In some implementations, the light source may be pulsed with a plurality of wavelengths of UV light. In some implementations a light from the light source may be polarized.

Irradiating the chlorinated aqueous liquid with UV light can produce a radical molecular species that reacts with the MTBE to oxidize the MTBE and form at least one degradation byproduct selected from the group consisting of tert-butyl formate (TBF), tert-butyl alcohol (TBA), acetone, carbon dioxide and water and forms a decontaminated aqueous liquid. As used herein, "decontaminated" is defined as removal of MTBE to a concentration preferably less than 100 ppb. Although degradation products of MTBE may remain in the decontaminated aqueous liquid, biologically activated filtration techniques that use microorganisms, fungi, yeast and other biological elements familiar to those skilled in the art can be used to remove the degradation products or further oxidize the degradation products to carbon dioxide and water.

The radical species may include, but is not limited to at least one of a hydroxyl radical and chlorine radical. The decontaminated aqueous liquid has a lower concentration of MTBE than the concentration of MTBE in the contaminated aqueous liquid. In some implementations, the concentration of MTBE in the contaminated aqueous liquid is at least 1 ppm, is at least 10 ppm, is at least 15 ppm, is at least 25 ppm, is at least 50 ppm, is at least 100 ppm, is at least 500 ppm, is at least 1000 ppm. The concentration of MTBE is reduced in the decontaminated aqueous liquid by more than 10%, more than 20%, more than 30%, more than 40%, more than 50%, more than 60%, more than 70%, more than 80%, more than 90%, and more than 95%.

In some implementations, the irradiating and the mixing with the chlorine source may occur simultaneously.

In some implementations, at least one NORMAG™ photoreactor may be used to irradiate the chlorinated aqueous liquid. In some implementations the Bersen InLine® may be used to irradiate the chlorinated aqueous liquid.

An apparatus containing the light source that emits the ultraviolet (UV) light may take several forms in addition to the NORMAG photoreactor and the Bersen InLine®. In some implementations, the apparatus may encase at least one light source in a UV permissive casing in an elongated cubic shape or cylindrical shape. The apparatus may also take the form of at least one fiber optic. In some implementations, multiple fiber optic fibers may be bundled to form a multiple point tree-like structure that is gathered at a central point forming a trunk and branches of each fiber optic fiber with a light emitting end of the fiber optic directed away from the trunk like a ray. Each fiber optic end may extend out and around the circumference of the trunk of bundled fiber optic fibers. The light in the cylindrical shape, elongated cubic shape, or fiber optic may be submerged into a container holding the chlorinated aqueous liquid. The container may have an inflow port and an outflow port through which the chlorinated aqueous liquid may enter to be irradiated by the light source in the apparatus and then exit after irradiation. The apparatus may also be suspended above and directed toward the container holding the chlorinated aqueous liquid at a distance above a surface of the chlorinated aqueous liquid of less than 50 cm, less than 30 cm, less than 20 cm, less than 10 cm, less than 5 cm. In some implementations the container is transparent to UV light and the apparatus containing the light source may surround at least one container holding the chlorinated aqueous liquid and direct the light into at least one container.

In some implementations, the process further includes mixing the chlorinated aqueous liquid after irradiating with an oxygen radical generating compound. In some implementations, the oxygen radical generating compound is $O_3$ and/or $H_2O_2$. $O_3$ and $H_2O_2$ are known to produce oxygen radicals and may scavenge and remove chlorine and further oxidize the degradation products. In some implementations, the $O_3$ and/or $H_2O_2$ is added at a concentration that exceeds the concentration of the chlorine and/or the hypochlorous acid salt in the chlorinated aqueous liquid by at least 5 times the concentration, at least 10 times the concentration, at least 15 times the concentration, at least 20 times the concentration, at least 25 times the concentration, at least 30 times the concentration, at least 35 times the concentration. In some implementations the process further includes filtering through an activated carbon or biologically active filters to remove remnant degradation products of MTBE that may have remained unoxidized by chlorine radicals, oxygen radicals, or hydroxyl radicals.

According to another aspect, the present disclosure relates to a continuous flow process for decontaminating the contaminated aqueous liquid, e.g., an aqueous liquid comprising methyl-tert-butyl ether (MTBE). The continuous flow process includes flowing the contaminated aqueous liquid comprising water and MTBE while pretreating the contaminated aqueous liquid with chlorine and/or a hypochlorous acid salt to form a chlorinated aqueous liquid. Next, the chlorinated aqueous liquid is irradiated with a light source having a wavelength of about 254 nm. The light source may be from either a monochromatic light source that generates approximately 254 nm wavelength of light or from a polychromatic light source having wavelengths between approximately 200 nm and 370 nm, to produce a radical molecular species that degrades the MTBE thus resulting in a decontaminated aqueous liquid. The MTBE can be degraded into at least one degradation byproduct, for example, selected from the group consisting of tert-butyl formate (TBF), tert-butyl alcohol (TBA), acetone, carbon dioxide and water.

Figure 2:
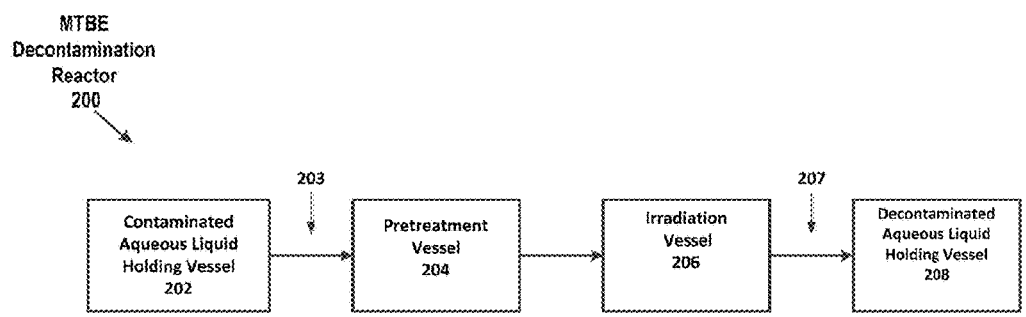
FIG. 2 is an exemplary diagram of a MTBE Decontamination Reactor.
Figure 3:
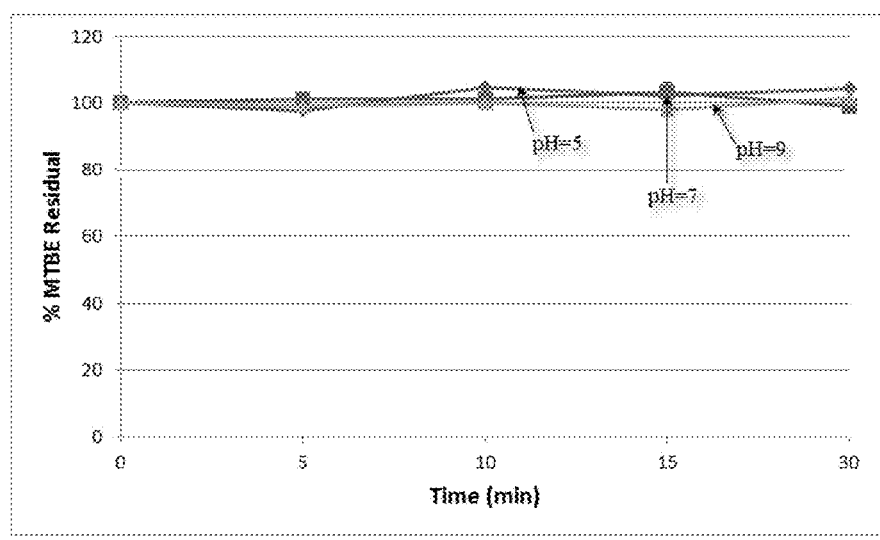
FIG. 3 is an exemplary graph of a control experiment of a residual percent MTBE after circulation without treatment.

The continuous flow process of the present disclosure refers to a continuous flow process that involves a pretreatment stage and an irradiation stage. As depicted in FIG. 2, the pretreatment stage and irradiation stage may each take place in separate vessels, such that the pretreatment stage takes place in a pretreatment vessel 204 and the irradiation stage takes place in an irradiation vessel 206. Upstream of the pretreatment vessel 204 can be a contaminated aqueous liquid holding vessel 202 which holds the contaminated aqueous liquid before the contaminated aqueous liquid flows into the pretreatment vessel 204. Downstream of the irradiation vessel may be a decontaminated aqueous liquid holding vessel 208, which holds the decontaminated aqueous liquid after irradiation. Each vessel may be part of an MTBE decontamination reactor 200 in which the continuous flow process of the present disclosure may take place.

In some implementations, the pretreating may include any one or more of pre-filtering, acidifying, basifying, and buffering. In some implementations, at least one of the pre-filtering, acidifying, basifying, and buffering may occur before pretreating the contaminated aqueous liquid with chlorine and/or a hypochlorous acid salt.

Pre-filtering may employ several filters including, but not limited to industrial submicron filters, a coarse screen filter, a carbon filter, and an oil filter. Because the contaminated aqueous liquid may be from a variety of sources, the pre-filtering may be necessary to remove particulate matter and long-chain fatty organic molecules that cannot be decontaminated through the continuous flow process of the present disclosure. The pre-filtering may occur in a single stage or multiple stages of the continuous flow process. For example, the pre-filtering may first continuously flow the contaminated aqueous liquid through a piping system and through a plurality of stages of the coarse filter to remove particles of greater than 0.5 mm, 50 microns, and 1 micron, then filtering through a submicron filter, then filtering through an oil filter, and finally an activated carbon filter. The pre-filtering may occur while the contaminated aqueous liquid is flowing into the pretreatment vessel 203, but may occur at any point upstream of the pretreatment vessel.

Acidifying may include adding the Arrhenius acid to change the pH of the contaminated aqueous liquid to approximately pH 1-10, to approximately pH 3-8, or preferably to approximately pH 5-7. The Arrhenius acid may include, but is not limited to hydrochloric acid and sulfuric acid.

Basifying may include adding the Arrhenius base to change the pH of the contaminated aqueous liquid to approximately pH 1-10, to approximately pH 3-8, or preferably to approximately pH 5-7. The Arrhenius base may include, but not limited to sodium hydroxide and potassium hydroxide. Basifying may include adding amines which may include, but are not limited to methylamine, ethylamine, and pyridine.

Buffering may include adding a buffering agent to the contaminated aqueous liquid to maintain the pH approximately between pH 5 and pH 7. A pKa of the buffering agent is preferably between the range of pH to be maintained in order to be effective. Using the Hendersen-Hasselbach equation the buffering agent proportions can be determined. The buffering agent may be added in conjunction with acidifying or basifying but may be added independently as well. The buffering agent may include, but is not limited to cacodylate, maleate, sodium phosphate, and sodium hydrogen phosphate.

In some implementations, the acidifying, basifying and buffering can occur while the contaminated aqueous liquid is in the pretreatment vessel, whereas, the pre-filtering may necessitate that the contaminated aqueous liquid to be flowing into the pretreatment vessel to complete the pre-filtering.

In some implementations of the continuous flow process for decontamination may use the concentration of chlorine and/or the hypochlorous acid salt as described above. In some implementations, the concentration of the chlorine and/or the hypochlorous acid salt may be greater than the concentration of the MTBE in the chlorinated aqueous liquid as described above.

In the irradiation stage of the continuous flow process, in some implementations, the light source is a Low Pressure UV lamp or a Medium Pressure UV lamp. The light source may be oriented in various ways to irradiate the chlorinated aqueous liquid. In some implementations, the light source may be encased in a UV permissive material protected from any liquid penetration, shaped in an elongated cylinder or cube, as described above. In some implementations of the continuous process, the elongated cylinder or cube may be inserted perpendicularly through the cross section of the piping system through which the chlorinated aqueous liquid flows and may be irradiated. In some implementations, at least one light source may be inserted through a center of the piping system, parallel to the longitudinal axis of the piping system. In some implementations the light source may be suspended above a transparent and UV-permissive piping system, through which the chlorinated aqueous liquid flows and can be irradiated. In some implementations the light source may be directed into the piping system by a light guide or from an assembly that is perpendicular to the piping system. In some implementations the piping system can recirculate the chlorinated aqueous liquid and the chlorinated aqueous liquid can continuously be irradiated by the light source in any of the above described implementations.

In some implementations, the chlorinated aqueous liquid may flow from the pretreatment vessel into the irradiation vessel. Within the irradiation vessel, at least one light source may be submerged into the vessel when filled with the chlorinated aqueous liquid to irradiate the chlorinated aqueous liquid. In some implementations the irradiation vessel may also be equipped with a mixer and pump to circulate the chlorinated aqueous liquid while it is irradiated by the light source.

In some implementations, at least one NORMAG™ photoreactor may be used to irradiate the chlorinated aqueous liquid. In some implementations the Bersen InLine® unit may be used to irradiate the chlorinated aqueous liquid. For example, as the chlorinated aqueous liquid flows out of the pretreatment vessel, the chlorinated aqueous liquid may flow through the Bersen InLine®. Several Bersen InLine® units may be placed in parallel and act as the irradiation vessel 206 such that the irradiating is occurring during flow from the pretreatment vessel 204 to the decontaminated aqueous liquid holding vessel 208.

In some implementations, the concentration of MTBE in the contaminated aqueous liquid is at least 1 ppm, is at least 10 ppm, is at least 15 ppm, is at least 25 ppm, is at least 50 ppm, is at least 100 ppm, is at least 500 ppm, is at least 1000 ppm. The concentration of MTBE is reduced in the decontaminated aqueous liquid by more than 10%, more than 20%, more than 30%, more than 40%, more than 50%, more than 60%, more than 70%, more than 805, more than 90%, and more than 95%.

In some implementations, the continuous flow process includes mixing the chlorinated aqueous liquid after irradiation with an oxygen radical generating compound. In some implementations, the oxygen radical generating compound is $O_3$ and/or $H_2O_2$. In some implementations, the $O_3$ and/or $H_2O_2$ is added at a concentration that exceeds the concentration of the chlorine and/or the hypochlorous acid salt in the chlorinated aqueous liquid by at least 5 times the concentration, at least 10 times the concentration, at least 15 times the concentration, at least 20 times the concentration, at least 25 times the concentration, at least 30 times the concentration, at least 35 times the concentration. In some implementations, the chlorinated aqueous liquid may receive a second exposure to the light source after the oxygen radical generating is mixed into the chlorinated aqueous liquid.

In some implementations, the continuous flow process further includes filtering through an activated carbon or biologically active filters to remove remnant degradation products of MTBE that may have remained unoxidized by chlorine radicals, oxygen radicals, or hydroxyl radicals. In some implementations filtering through activated carbon or biologically active filters may occur downstream of the irradiation vessel 206, but upstream of the decontaminated aqueous liquid holding vessel 208, 207 in FIG. 2.

In some implementations, the continuous flow process may employ a controller system to do at least one of adding chlorine and/or a hypochlorous acid salt, adding the oxygen radical generating compound, acidifying, basifying, and buffering. In some implementations, the controller system may determine a quantity to add by interpreting a signal produced by an instrument that is connected to the controller system. The instrument may include, but is not limited to at least one chemical analysis instrument such as a gas chromatographer, an high pressure liquid chromatographer, a mass spectrometer, a pH meter, and a spectrophotometer.

The examples below are intended to further illustrate the decontamination of the contaminated aqueous liquid comprising methyl-tert-butyl ether and are not intended to limit the scope of the claims.

Example 1

Method and Materials
Chemicals and Solutions

Sigma Aldrich HPLC grade, 99.999% purity of MTBE, Tert-Butyl Formate (TBF), and 5.25% sodium hypochlorite were purchased from local chemical vendors in Saudi Arabia. Deionized water from Mili-Q direct purification system was used for preparation of 100 ppm MTBE, and 1000 ppm free chlorine stock solutions, from which water was spiked prior to treatment. The flask was stoppered tightly and wrapped with the aluminum foil and then kept in the refrigerator at 4° C. The desired concentration of MTBE was diluted into the experimental vessel from the prepared stock solution. Sodium hydroxide (NaOH) pellets, 98% concentrated sulfuric acid were obtained from Merck, and DPD (N, N diethyl-p-phenylenediamine) Tablet NO. 1 were also utilized.

Photo-Reactor Setup

Batch experiments were carried out in a NORMAG® tubular photoreactor with forced liquid circulation. The photoreactor vessel has a total volume of 470 ml and housed with two types of ultraviolet mercury lamps: namely Low pressure and medium pressure lamps obtained from Heraeus (Heraeus Noblelight America, LLC, Gaithersburg, Md.). As per the manufacturer, low pressure lamps (LP) emit radiation at a wavelength of 254 nm with intensity of $6.5 \times 10^{-3}$ $W/cm^2$ from 15 Watt power source (TNN 15/32, 55 Volts, Cat No. SAA 09370); and medium pressure lamps (MP) deliver a broadband spectrum over the complete range of 200-400 nm with intensity of $=5.3 \times 10^{-2}$ $W/cm^2$ from 150 Watt power source (TQ 150, 85 Volts, Cat No. SAA 09360). LP lamp produces a spectrum mainly at 254 nm and it can be described practically as monochromatic. It was shown that the MP lamp gives much weaker intensity at 254 nm wavelength, but it has significant UV-peaks at higher wavelengths including 365 nm. The MP lamp also emits very strong peaks within the Visible-region.

Experiment Design

Several bench scale experiments were conducted based on the following experimental design: (a) blank run: circulation of MTBE spiked deionized water alone to account for the loss of MTBE due to volatilization, (b) treatment of MTBE spiked water by a combination of free chlorine alone at 10, 25, 50 ppm and pH of 5, 7, and 9, (c) treatment of MTBE spiked water by a combination of UV lamp type, chlorine dosages (2-50 ppm), and pH 5, 7, and 9. Finally, the optimized conditions were tested on the natural groundwater spiked with MTBE. The natural groundwater sample was obtained from a well located in Dhahran, Saudi Arabia. During each experiment run, the water spiked with 1000 ppb MTBE was circulated for 10 minutes to ensure uniform dilution of MTBE in the reactor before starting the treatment and collecting the first sample at time zero (before treatment). Then, the desired amount of chlorine was injected and in the meantime the selected lamp type was turned on. In all experiment, water samples were collected at treatment time of 5, 10, 15, 30 minutes and tested for the MTBE residual, degradation byproducts, and chlorine residual. About 5 ml of 0.01N sodium thiosulfate is required to dechlorinate 5 ppm of residual chlorine in the effluent before discharge.

Analytical Methods

Water samples were collected from the UV photoreactor before and after the treatment and analyzed for its concentration levels of MTBE and degradation byproducts by using an ISQ single quadrupole GC/MS system (Thermo Scientific) equipped with TriPlus for headspace injection system. A 60 m long, 0.32 mm i.d. Rtx-502.2 (Restek Corp., USA) capillary column was used for the separation purpose. The carrier gas was helium flowing at the rate of 1.7 $mL \cdot min^{-1}$. The column temperature was programmed to rise from 50 to 220° C. at the rate of 20° $C. \cdot min^{-1}$. The mass spectrometer was operated in the selected ion mode (SIM). Calibration curves were prepared for MTBE and some by-products (BS Tawabini, 2014). 1 mL of the collected water samples was immediately transferred to the head space Thermo Scientific standard vials and placed in the Autosampler sequences for the analysis of MTBE, and degradation byproducts. The GC/MS output was acquired, stored, and processed by Thermo Scientific™ Xcalibur software programmed. Residual chlorine level was monitored using Analytik Jena's UV/Vis spectrophotometer SPECORD® 50 using DPD method. Duplicate analysis was carried out for each sample.

Example 2

Results and Discussion

Blank runs were conducted to estimate the loss of MTBE due to stirring alone. In this experiment, 1000 ppb of MTBE was spiked into deionized water, and continuously circulated for 30 minutes at a constant flow rate (i.e. 30% of the pump capacity) in the closed system of photoreactor. The blank runs were conducted under different pH conditions to observe the pH effects. A loss of about 2% of MTBE at pH 5 and a loss of 1%-2% of MTBE at pH 7 and 9 was observed while circulating in the closed system for 30 minutes (FIG. 2). In the present disclosure, the loss of MTBE was very minimal. This could be due to the low MTBE concentration (i.e., 1 ppm) used in the present disclosure. Constant room temperature was maintained in this study. There was no degradation of MTBE due to the circulation alone, which is confirmed by the nonappearance of the degradation byproducts.

Example 3

Figure 4:
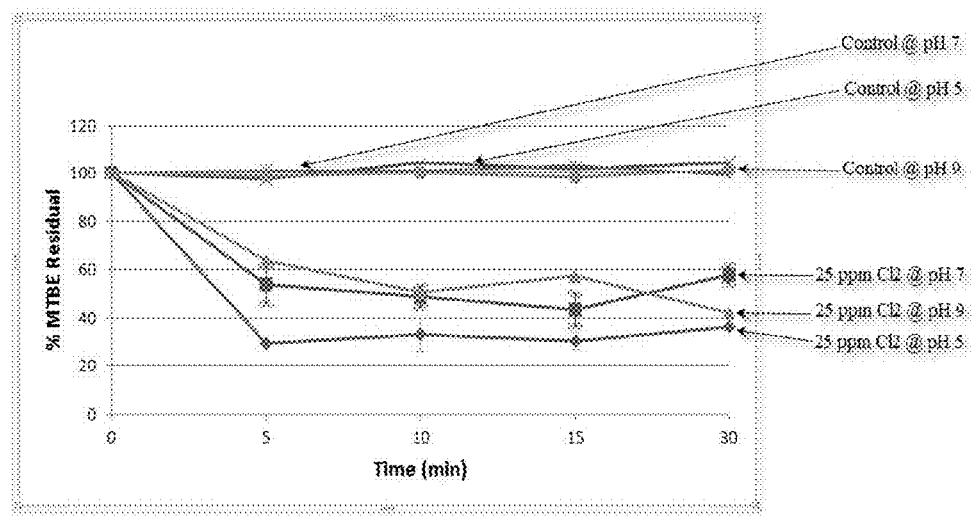
FIG. 4 is an exemplary graph of an experiment of a residual percent MTBE after circulation with treatment.
Figure 5:
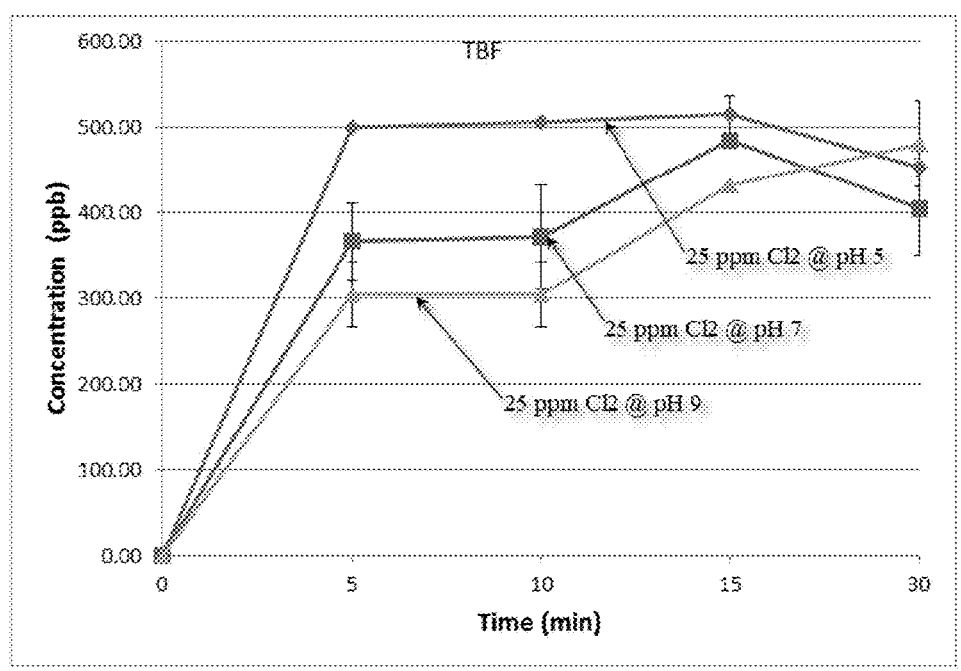
FIG. 5 is an exemplary graph of an experiment of a concentration of TBF after circulation with treatment.

Removal of MTBE by Chlorine Alone
Effect of pH on MTBE Removal Efficiency by Chlorine Alone The pH effect on the degradation of MTBE with 25 ppm of free chlorine alone was investigated. The pH effect on the degradation of MTBE was observed that about 63.6%, 42%, and 58% of MTBE were chemically oxidized by 25 ppm of free chlorine alone at pH 5, 7, and 9 after 30 minutes, respectively. By comparison the removal of MTBE was the most at pH 5 (FIG. 4). This is due to the presences of 99.7% hypochlorous acid at acidic pH which is also more effective than hypochlorite for disinfection of harmful microorganisms in drinking water treatment plant. The reactivity of chlorine with organic depends on the pH of the aqueous solution. Hypochlorous acid is a dominant reactive species with most organic compounds due to its oxidizing power and chemical structure characterized by Cl—O bond polarization. The monitored degradation byproduct (i.e., TBF) confirmed that at pH 5, hypochlorous can oxidize MTBE to some extent. The MTBE degradation mechanism by chlorine alone might be due to either of the following mechanism or combination of them: (i) oxidation reactions, (ii) addition reactions to unsaturated bonds, (iii) electrophilic substitution reactions at nucleophilic sites. The highest TBF measurement was observed at pH 5, reaching to about 500 ppb between 5 and 15 minutes of contact time (FIG. 5). However, after 15 minutes a slight decline of TBF was observed that might be due to the chemical oxidation, which might also have happened between TBF and free chlorine species. The same trend was seen at pH 7 and 9 but having different level of TBF (pH 5 greater than pH 7 greater than pH 9) (FIG. 5). Comparing the reaction time required to degrade certain level of MTBE to TBF, and other byproducts, shorter time was observed at pH 5 than at pH 7 and 9. In all the cases, a substantial level of TBF production was recognized within 5 minutes reaction time.

Effect of Chlorine Dosage on MTBE Removal Efficiency by Chlorine Alone

Figure 6:
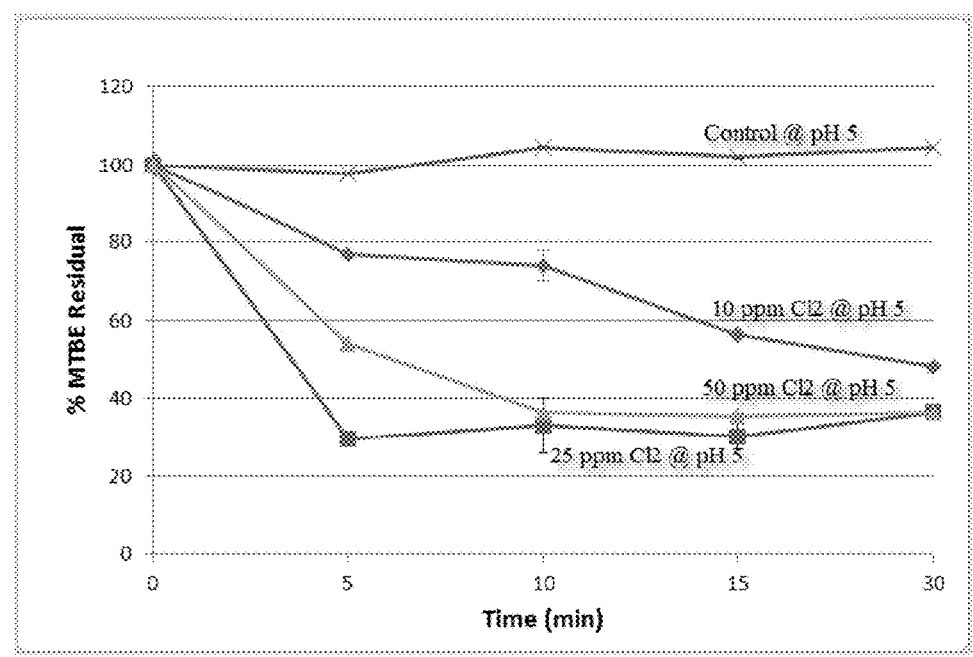
FIG. 6 is an exemplary graph of an experiment of a residual percent MTBE after circulation with treatment.

Chlorine is one of the potential chemical oxidants with 1.49 oxidation power. Liquid chlorine in the form of sodium hypochlorite is a widely used form of chlorine in water and wastewater treatment. The MTBE degradation efficiency of 52%, 64%, and 64% of MTBE removal was observed due to 10, 25, and 50 ppm of free chlorine alone after 30 minutes of treatment time, respectively (FIG. 6). The dose effect between 25 and 50 ppm of free chlorine did not show significant difference. This might be due to the low MTBE concentration available to react with excess free chlorine (i.e., 50 ppm). However, increasing the free chlorine dose from 10 ppm to 25 ppm has increased the MTBE removal efficiency from 52% to 64% after 30 minutes of treatment time. 25 ppm of free chlorine was selected as a dose to react 1000 ppb of MTBE in this study. The mechanism of MTBE degradation by free chlorine alone was discussed above.

Figure 7:
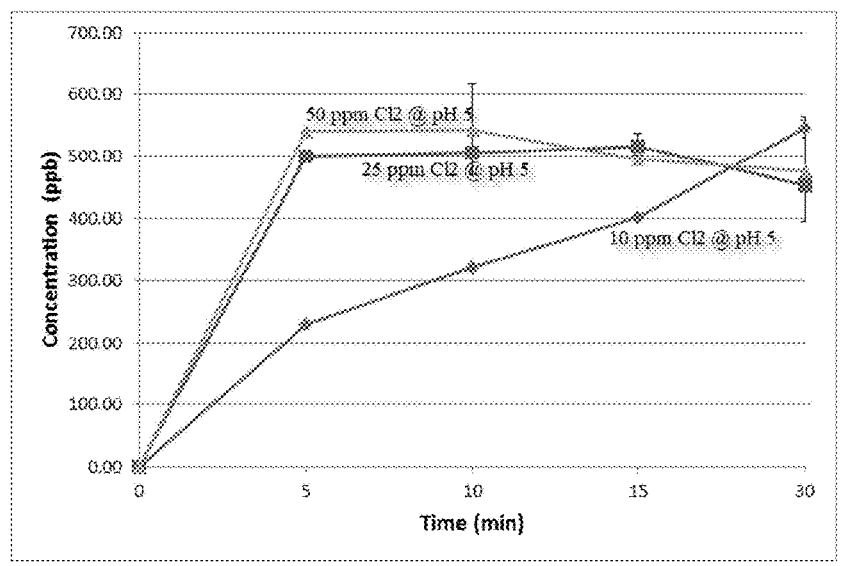
FIG. 7 is an exemplary graph of an experiment of a concentration of TBF after circulation with treatment.

Like other chemical oxidants such as OH, $O_3$, $MNO_4$, and $S_2O_4$, chlorine species able to degrade MTBE to byproducts (TBF, TBA, and acetone). Theoretically carbon dioxide and water are the final degradation of MTBE; however MTBE degradation involves multi-chain reactions. The transformation of MTBE to TBF was a dominant event and concurrently TBF also oxidized to TBA and acetone. TBF was the dominant byproduct observed. The level of TBF reached to 500-600 ppb between 5-10 minutes of treatment time when 25 and 50 ppm free chlorine alone was applied (FIG. 7).

Example 4

Removal of MTBE by UV/Chlorine Process

To understand the set of conditions under which MTBE is removed from the aqueous solution, treatment parameters such as oxidant dosages, pH, UV type, and contact time were varied and their impacts on the removal efficiency of MTBE by UV/chlorine was determined.

Effect of pH on MTBE Removal Efficiency by LP UV/Chlorine

Figure 8:
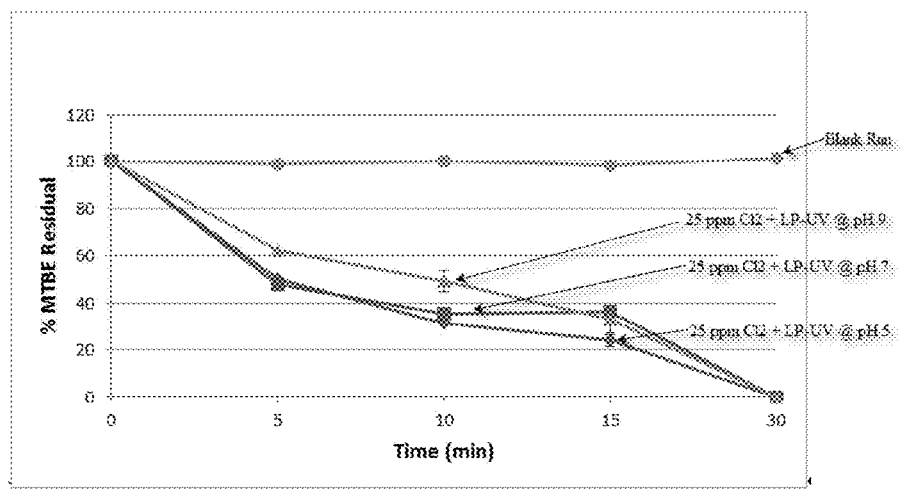
FIG. 8 is an exemplary graph of an experiment of a residual percent MTBE after circulation with treatment.
Figure 9:
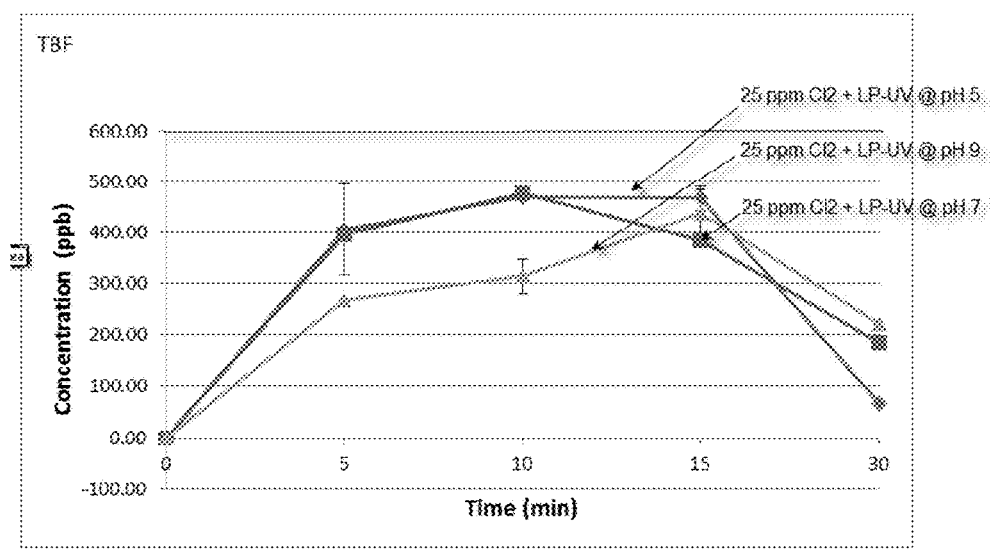
FIG. 9 is an exemplary graph of an experiment of a concentration of TBF after circulation with treatment.

The availability of free chlorine species in the water depends on the solution's pH. At the acidic pH condition hypochlorous acid (OCl$^-$) is abundant while in alkali solution hypochlorite (OCl$^-$) is dominant. In this study, pH 5, 7, and 9 were used to assess the effectiveness of free chlorine based advanced oxidation process to degrade MTBE in water. Another experimental conditions used were: LP UV, chlorine dosage (5, 10, 25 ppm), 30 minutes exposure time, and 1000 ppb initial concentrations of MTBE. At pH 5, the MTBE removal is slightly better than pH 7 and 9 (FIG. 8). In general, regardless of pH effect, MTBE can be completely degraded to TBF and other byproducts by LP UV and 25 ppm of free chlorine after 30 minutes. The removal mechanism of the UV/chlorine could be due to the synergistic effect of thiosulfate, UV photolysis, radical oxidation, and chemical oxidation by free chlorine. The dominant reacting radical mainly generated from the UV/chlorine AOP is hydroxyl (OH.) in addition to chlorine radical. The reaction of HOCl with OH radical was determined as $8.5 \times 10^4$ $M^{-1} \cdot s^{-1}$ which indicates the lesser scavenging effect than $H_2O_2$ with OH radical having reaction rate of $2.7 \times 10^7$ $M^{-1} \cdot s^{-1}$ during the photolysis of free chlorine at a pH greater than pH 5.5. The higher .OH radical formation in irradiated HOCl solutions, relative to hydrogen peroxide, may be a function of higher molar absorption coefficients of HOCl between 220 nm and 320 nm. FIG. 9 presented the degradation byproduct (i.e., TBF) generated at pH 5, 7, and 9. It was observed that some of the TBF was also degraded to other byproducts like TBA, and acetone after 15 minutes.

Effect of pH on MTBE Removal Efficiency by MP UV/Chlorine

Figure 10:
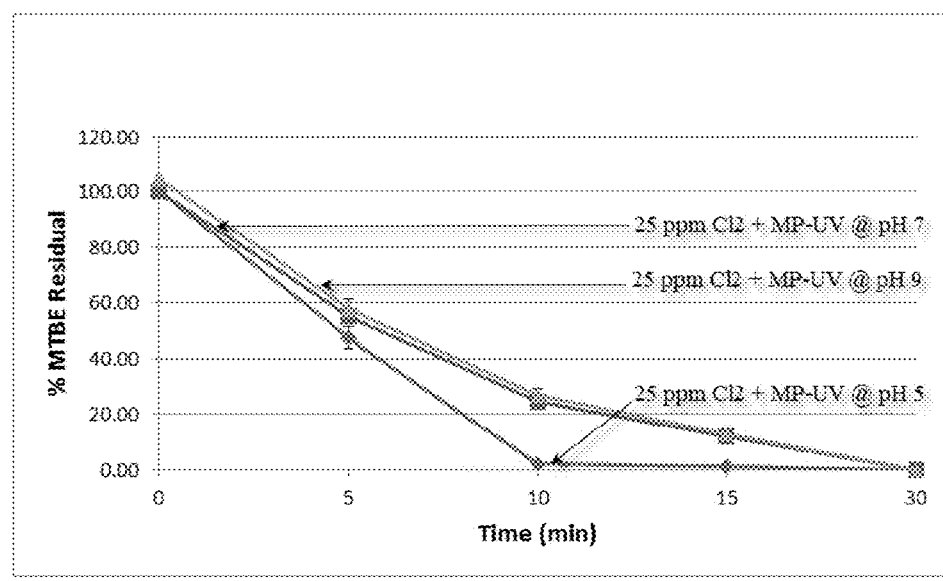
FIG. 10 is an exemplary graph of an experiment of a residual percent MTBE after circulation with treatment.
Figure 11:
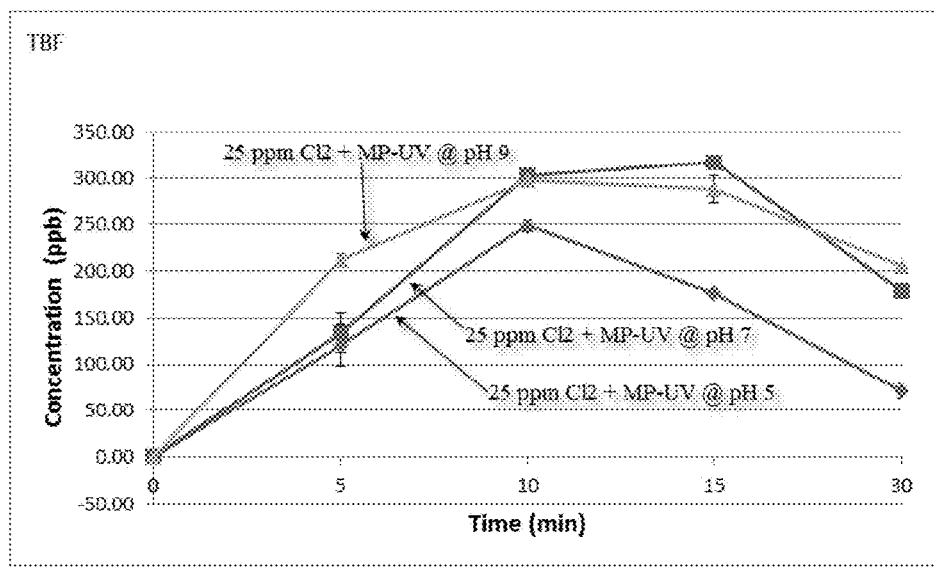
FIG. 11 is an exemplary graph of an experiment of a concentration of TBF after circulation with treatment.

MP UV lamp and 25 ppm of free chlorine were used to degrade MTBE from synthetic water having a pH of 5, 7, and 9 and 30 minutes treatment time (FIG. 10). Greater performance of MTBE degradation was observed at pH 5 than pH 7, and pH 9. This might be due to the 99.7% of HOCl available at pH greater than 5.5 and the lower scavenging rate of OH radicals. The degradation mechanism could be dominantly due to OH radical. The effect of pH 7 and pH 9 were overlapping. This confirmed that MP UV with chlorine can degrade MTBE also at neutral and basic condition. MTBE degradation with MP UV/chlorine shows 35-42% improvement comparing with MP UV alone and 25 ppm free chlorine alone at pH 5 (FIG. 10). The MTBE degradation pattern was seen as MP UV/free chlorine greater than free chlorine alone greater than MP UV alone after 5 minutes treatment time. The MP UV/free chlorine at pH 5 has also resulted in the minimal TBF concentration (FIG. 11). The minimal TBF concentration could be due to the indiscriminate reaction of OH radicals with all the organics present in the synthetic water. Regardless of pH effect the TBF level generated declined after 10 minutes of treatment time. It might be possible to completely degrade TBF by increasing the treatment time.

Effect of Chlorine Dosage on MTBE Removal Efficiency by LP UV/Chlorine

Figure 12:
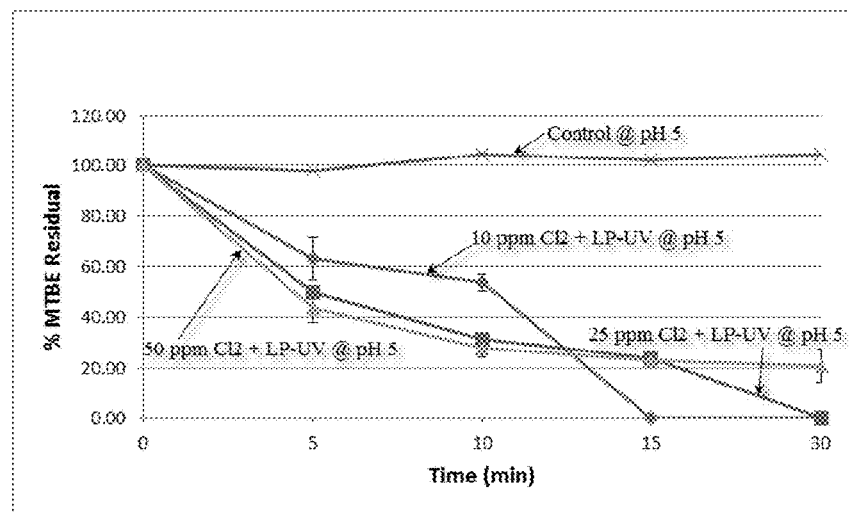
FIG. 12 is an exemplary graph of an experiment of a residual percent MTBE after circulation with treatment.
Figure 13:
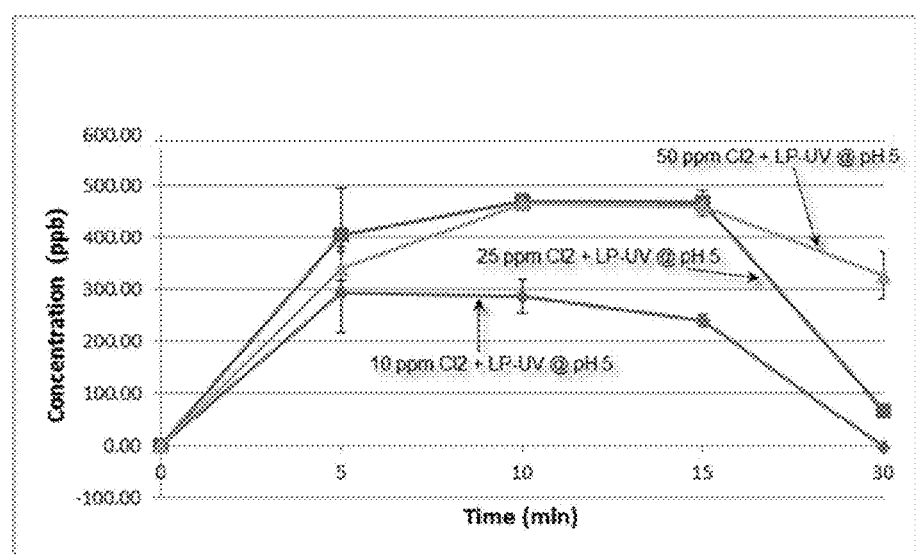
FIG. 13 is an exemplary graph of an experiment of a concentration of TBF after circulation with treatment.

The higher chlorine dosage shows better degradation at 5-10 minutes of treatment time. However, after 15 minutes the lower dose (10 ppm) and the moderate dose (25 ppm) were able to degrade MTBE completely (FIG. 12). The lower degradation efficiency observed at 50 ppm of free chlorine might be due to a scavenging effect of excess HOCl. The scavenging effect of excess HOCl favors the lower dose of free chlorine during UV/chlorine AOP because the scavenging effect minimizes the required thiosulfate for quenching the residual chlorine. In the present disclosure, greater than 95% of MTBE removal was obtained at bench scale. The monitored degradation byproduct (i.e., TBF) was seen increasing until 10 minutes and then declined to some extent (FIG. 13).

Figure 14:
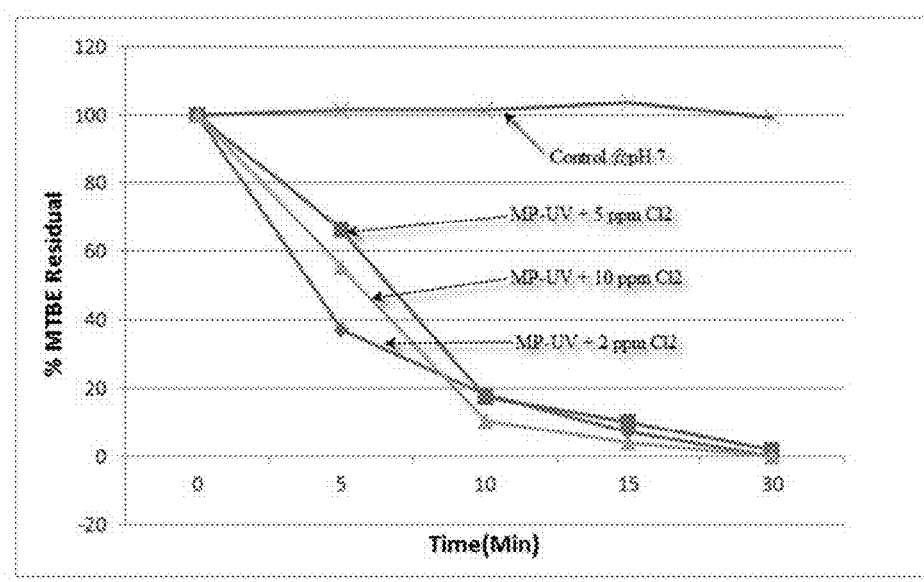
FIG. 14 is an exemplary graph of an experiment of a residual percent MTBE after circulation with treatment.
Figure 15:
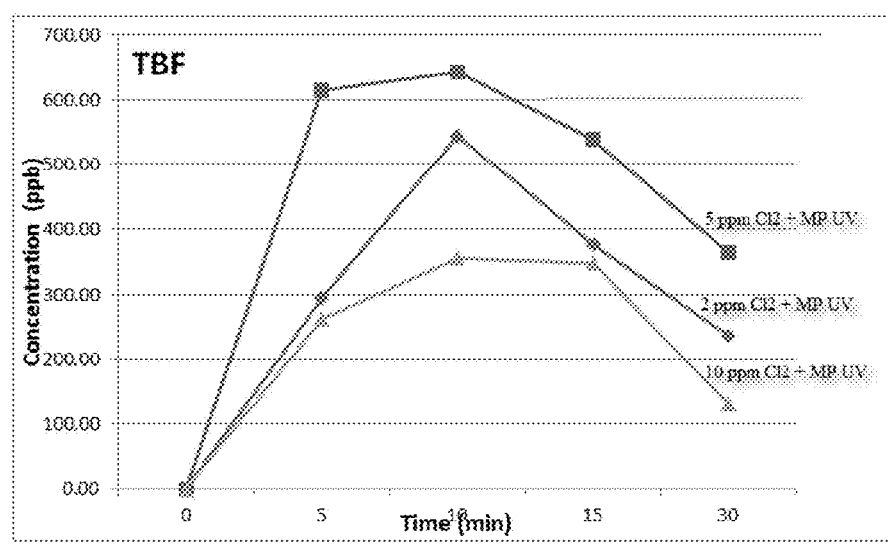
FIG. 15 is an exemplary graph of an experiment of a concentration of TBF after circulation with treatment.

Effect of Chlorine Dosage on the Degradation of MTBE with MP UV (150 Watt) Irradiation/Chlorine The differences in MTBE degradation between the three chlorine doses (i.e., 2, 5, 10 ppm) used were insignificant, however, after 5 minutes of exposure time, 10 ppm of chlorine showed a better MTBE removal efficiency than other doses (FIG. 14). This could be due to the yield of the radicals generated during the process. MP UV/chlorine was able to degrade MTBE completely and the generated byproducts after 30 minutes. The efficiency of MTBE degradation with MP UV alone may have been improved due to the OH. radicals mainly generated from the free chlorine which may indiscriminately react with MTBE and may have produced byproducts in the synthetic groundwater sample (FIG. 15).

Example 5

Removal of MTBE in Natural Groundwater Sample

Figure 16:
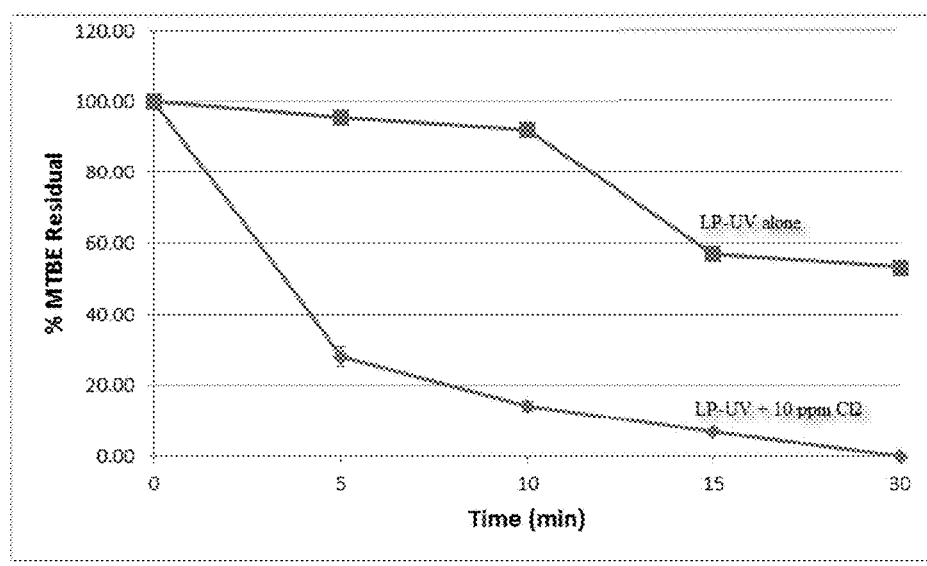
FIG. 16 is an exemplary graph of an experiment of a residual percent MTBE after circulation with treatment.
Figure 17:
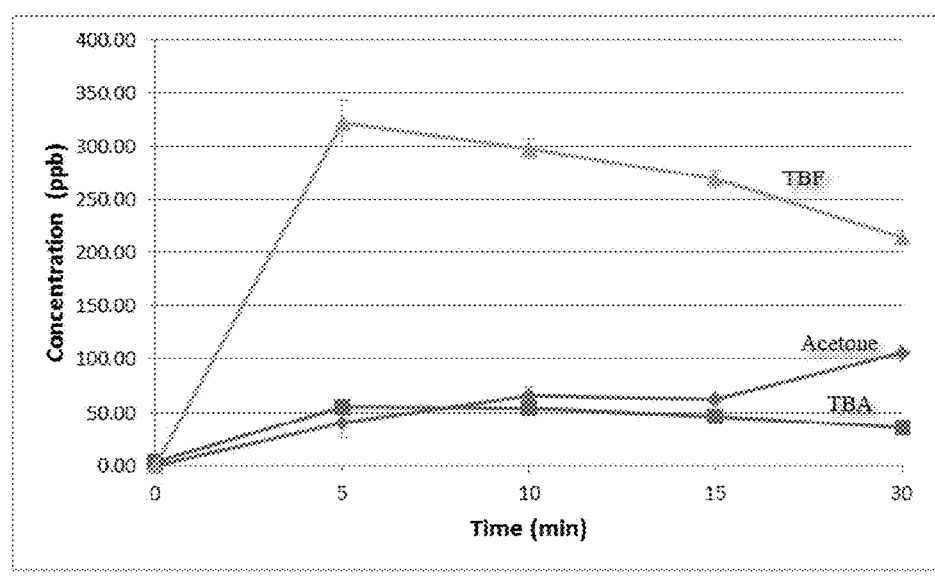
FIG. 17 is an exemplary graph of an experiment of degradation byproducts after circulation with treatment.
Figure 18:
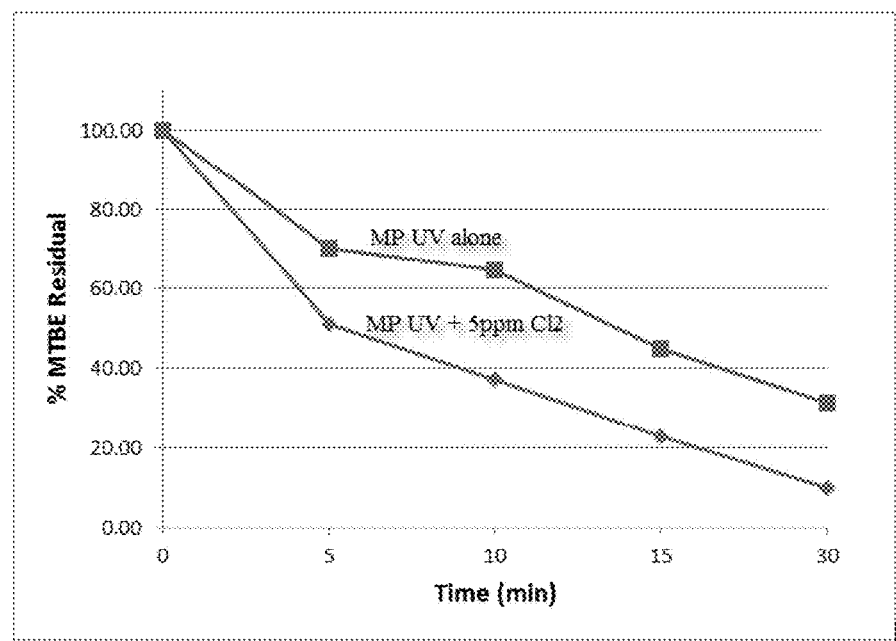
FIG. 18 is an exemplary graph of an experiment of a residual percent MTBE after circulation with treatment.

The conditions which produced the lowest MTBE in the synthetic groundwater sample experiment was tested on natural groundwater collected from inside King Fand University of Petroleum and Minerals (KFUPM) main campus, Dhahran, Saudi Arabia. The conditions which produced the lowest MTBE concentrations were LP UV, 10 ppm, and pH 5. At these conditions greater than 99% MTBE removal efficiency was obtained, and it was efficient in comparison to the MP UV/chlorine process as depicted in FIG. 16 and FIG. 18. The data depicted in FIG. 16 and FIG. 18 implicate that MTBE removal efficiency was improved by at least 90% than MTBE removal by UV/$H_2O_2$ which may be due to higher OH. radical yield and less scavenging effect. LP UV shows superior MTBE removal efficiency over the MP UV in terms of the low level of byproducts generated, and reduced energy requirement (FIG. 17). The low level of byproducts generated and reduced energy requirement might be due to the difference of oxidant used, and low radical (OH) scavenging effect of hypochlorous acid.

Figure 19:
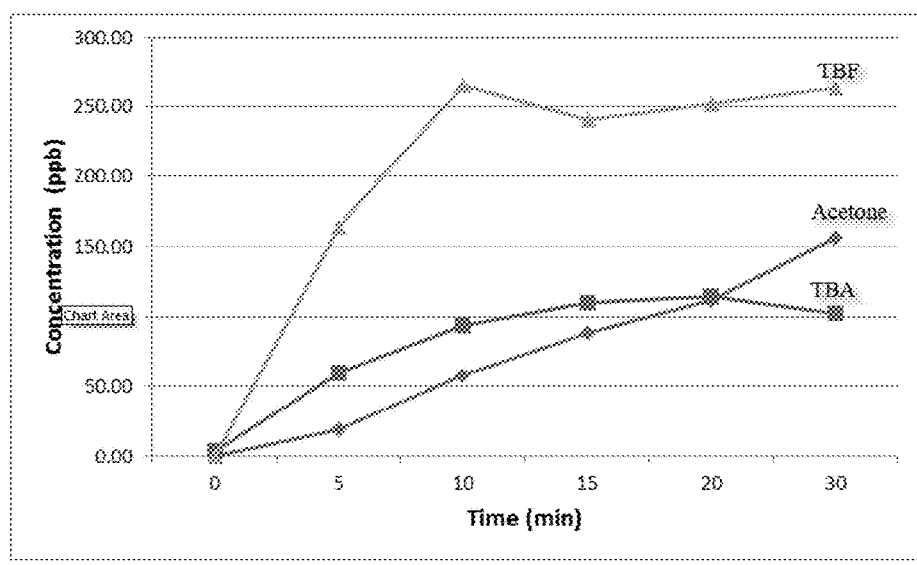
FIG. 19 is an exemplary graph of an experiment of degradation byproducts after circulation with treatment.

MTBE removal efficiency by UV/chlorine advanced oxidation was carried out under various treatment conditions. Accordingly, the conditions under which the results were obtained were LP UV/chlorine at 10 ppm chlorine, pH 5, 30 minutes, and Electrical Energy Order (EEO) of 4.01 kWh/m$^3$. The conditions were also tested on natural groundwater samples and greater than 99% MTBE removal efficiency was detected. LP UV AOP may be an improvement MP UV because of the low electrical energy order measured though MP UV/chlorine AOP, which can also degrade MTBE from synthetic groundwater samples and natural groundwater samples. The greater than 99% MTBE removal efficiency can be explained by the LP UV emission spectrum. The LP UV emission spectrum is a monochromatic radiation spectrum at 254 nm, and MTBE ability to absorb the emitted radiation at this wavelength may have contributed to the MTBE degradation. MTBE degradation by UV/chlorine followed the first order reaction rate. TBF degradation byproducts were as abundant as MTBE degradation byproducts (FIG. 19).

The invention claimed is:

1. A process for filtering and treating a contaminated aqueous liquid comprising methyl-tert-butyl ether (MTBE), comprising:
    pre-filtering the contaminated aqueous liquid with at least one selected from the group consisting of a submicron filter, a carbon filter, and an oil filter, to remove particulate matter and long-chain fatty organic molecules, then
    mixing chlorine and/or a hypochlorous acid salt with the filtered contaminated aqueous liquid to form a chlorinated aqueous liquid comprising 10-50 ppm of chlorine and/or the hypochlorous acid salt, relative to the total mass of the chlorinated aqueous liquid; and
    irradiating the chlorinated aqueous liquid with light having a wavelength of about 254 nm from a monochromatic light source that generates a 254 nm wavelength of light or with a polychromatic light source having wavelengths between 200 nm and 370 nm to oxidize the MTBE and form at least one degradation byproduct selected from the group consisting of tert-butyl formate (TBF), tert-butyl alcohol (TBA), acetone, carbon dioxide and water, and form a decontaminated aqueous liquid.

2. The process of claim 1, further comprising mixing the chlorinated aqueous liquid with an oxygen radical generating compound.

3. The process of claim 2, wherein the oxygen radical generating compound is $O_3$ and/or $H_2O_2$.

4. The process of claim 3, wherein the $O_3$ and/or $H_2O_2$ is present at 10-25 times the concentration of the chlorine and/or the hypochlorous acid salt in the chlorinated aqueous liquid.

5. The process of claim 1, wherein a concentration of the chlorine and/or hypochlorous acid salt is 10-50 times a concentration of the MTBE in the chlorinated aqueous liquid.

6. The process of claim 1, further comprising adjusting the pH of the contaminated aqueous liquid to a pH of 5-7 before the mixing.

7. The process of claim 6, wherein the pH of the contaminated aqueous liquid is adjusted with hydrochloric acid, sulfuric acid, or sodium hydroxide.

8. The process of claim 1, wherein the light source has a power between 10-200 W.

9. The process of claim 1, wherein the light source has an intensity between $5 \times 10^{-3}$ W/cm$^2$-$7 \times 10^{-2}$ W/cm$^2$.

10. The process of claim 1, wherein the irradiating generates a chlorine radical, a hydroxyl radical, or both from the chlorine and/or a hypochlorous acid salt present in the chlorinated aqueous liquid.

11. The process of claim 1, wherein the concentration of MTBE is at least 1 ppm in the contaminated aqueous liquid and the concentration of MTBE is reduced by more than 92% in the decontaminated aqueous liquid.

12. The process of claim 1, wherein chlorine is removed from the decontaminated aqueous liquid by thiosulfate, UV photolysis, radical oxidation, and chemical oxidation by free chlorine.

* * * * *